United States Patent
Saikawa et al.

(10) Patent No.: US 6,746,331 B1
(45) Date of Patent: Jun. 8, 2004

(54) ASSISTING A PLAYER TO CONTACT AN OBJECT BY ADJUSTING TIMING

(75) Inventors: Mitsuharu Saikawa, Tokyo (JP); Masayuki Inoue, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 603 days.

(21) Appl. No.: 09/617,130

(22) Filed: Jul. 14, 2000

(30) Foreign Application Priority Data

Jul. 16, 1999 (JP) .......................................... 11-234517

(51) Int. Cl.⁷ ............................................... A63F 13/02
(52) U.S. Cl. ........................................................ 463/31
(58) Field of Search ............................. 463/1–8, 30, 31, 463/32, 36–39, 40, 41, 42, 43, 44

(56) References Cited

U.S. PATENT DOCUMENTS

| 6,203,426 B1 | * | 3/2001 | Matsui et al. ................... 463/6 |
| 6,231,440 B1 | * | 5/2001 | Yamashita ...................... 463/7 |
| 6,394,897 B1 | * | 5/2002 | Togami ........................... 463/4 |
| 6,582,309 B2 | * | 6/2003 | Higurashi et al. ............. 463/31 |

* cited by examiner

*Primary Examiner*—Michael O'Neill
(74) *Attorney, Agent, or Firm*—Finnegan, Henderson, Farabow, Garret & Dunner, L.L.P.

(57) ABSTRACT

Systems and methods consistent with the present invention assist a user's ability to control a game such that the user's proficiency is largely independent of prior experience with the game. Disparities between users arising from differences in experience or unfavorable viewing perspective can be compensated by appropriately modifying the speed of the movement of actions taking place within the game. Additional embodiments are also provided which enhance the realism of the game display by improving the presentation of shadows.

4 Claims, 11 Drawing Sheets

| | | A | B | C | JUDGEMENT RESULT |
|---|---|---|---|---|---|
| PATTERN | ① | 0 | 0 | 0 | BAD SWING |
| | ② | 0 | 1 | 0 | THE SERIES OF MOVEMENTS AT A SLOW SPEED |
| | ③ | 1 | 0 | 0 | THE SERIES OF MOVEMENTS AT A STEADY SPEED |
| | ④ | 0 | 0 | 1 | THE SERIES OF MOVEMENTS AT A HIGH SPEED |
| | ⑤ | 0 | 0 | 0 | BAD SWING |

ASSISTING A PLAYER TO CONTACT AN OBJECT BY ADJUSTING TIMING

BACKGROUND OF THE INVENTION

1. Field of the Invention

The present invention relates to an image processing device and a game device, particularly to an image processing device to perform a program for a game device for business or family use.

2. Description of the Related Art

In recent years, many simulated games are provided as game programs for game devices, particularly for video game apparatuses. The object of these simulated games is to compete with others or a computer device, which is the main body of processing of the game device, over the dominance of the game, while experiencing actions such as fighting between characters appearing in the game, car racing competitions, sport contests, etc. Particularly in a simulated game of a sport contest using a ball, the user operates a plurality of keys equipped with a controller for providing the main game body with operation signals and controls the behaviors of a character such as a human character who appears in the game.

For example, in a tennis game for performing tennis matches, a competitor is selected, and the movements or behaviors of the selected player are controlled by operating the keys in the controller device which is equipped in the game body. For example, the movements of the player are controlled so that the player serves a tennis ball or hits the ball which a competitor hits. Therefore, the movements of the tennis ball depend on the key operation at the controller which performs the movements and behaviors of swinging a racket of the player selected by the user.

When the timing for swinging the tennis racket is shifted, in particular, there is a problem that the player can not hit the ball accurately with the racket so the player misses the ball and the direction of the ball is shifted from the intended direction.

In this example, the structure of the data of the tennis game is a three dimensional data structure. In the screen seen from a virtual camera, one player is located closer to the virtual camera and the other player is located farther away from the virtual camera, therefore, the user can recognize the perspective of the images on the screen.

Moreover, as it is required to change sides during a tennis match, the player operated by the user alternates the side between the side closer to the virtual camera to the side farther away from the virtual camera. Because of this, it is difficult for the player to understand the timing for swinging the tennis racket, therefore, it can be predicted that the timing for hitting the ball with the racket may not be optimal, in other words, the impact is shifted. Normally, it is not easy to hit the ball which is a small flying body by moving the player character accurately, in a screen where a model in a three dimensional space is converted into a picture of two dimensions.

In a tennis game, for example, the conventional inventions amend the timing of the player's swing. However, it can be against the user's desire to change the timing of its swing.

Next, other problems of the conventional technology are explained. In the conventional inventions, the image processing displays a model which is half transparent, such as a texture, by providing the image data with the data of transparency. In this image processing as a conventional example, the background can be seen through characters by providing the models, such as characters etc., with the data of half transparency. This data of half transparency is called $\alpha$, and the processing of half transparency becomes possible by setting the value of the $\alpha$ in the range from 0 to 1 properly.

This half transparency processing has been broadly used in the field of Computer Graphics (CG) in the case of performing representations of the screen, and as an example of applying such processing, there is a case of displaying a shadow to a character. Regarding this processing, there was a case when the value of $\alpha$ is given to the polygon model of a shadow and the shadow is displayed as half transparent on the land of the background. $\alpha$ is set for the data of each vertex data of a polygon constituting the shadow, and the value $\alpha$ of the picture element parts except the vertexes is calculated by interpolation.

In this conventional example, a part where the shadow models overlap, the value $\alpha$ of the shadows is duplicated and so that part is displayed darkly, in short, that part is displayed at lower transparency than other parts. For example, in the case of a human body, the shadow part of joints, where the shadow polygon corresponding to a brachial arm and the shadow polygon corresponding to a lower arm overlap, is displayed as a dark shadow. In the real world, it is unnatural if the joint part has a darker shadow than the other parts, therefore, the user may feel the model is inadequate when such a problem is ignored in the image processing device.

Furthermore, in a three dimensional game, shadows are generated by the lights from floodlights corresponding to the character of the player. By the way, there is a case when such shadows overlap one another when a plurality of floodlights exist in different positions. Here, there has to be a difference between the darkness of the shadow generated by the quantity of light of one floodlight and the darkness of the shadow generated by the quantity of light of two floodlights, however, there is no improvements made regarding such point in the conventional game devices. If the shadow is not realistic, there will be a difference between a real shadow and the shadow in the game, and the interest of the user to the game will be lost.

SUMMARY OF THE INVENTION

The present invention provides a system in which a game using a game device can be developed smoothly by assisting the user's operation of the game device. The present invention also provides a game device for hitting or hitting back an object such as a ball by a series of movements in a short period such as swinging a racket or a bat, wherein the series of movements are preferably matched to the behaviors of an object such as a ball by accurately assisting or helping the user's operation without impairing the user's will.

The present invention displays a highly realistic representation of the game image. The present invention also provides a game device which allows processing such that the display of shadows of objects on the game screen complies with the display of real shadows.

The present invention comprises an image processing means wherein, when a first object and a second object move in a game space, the movement of the first object is controlled by inputting operations at an operation member, and if there is an input of operations at the operation member to match the movement timings of both objects, image processing is performed in order to make the moving motion of the first object influence the movement of the second object, and controlling means for controlling the speed of the moving motion of the first object in accordance with the operation timing of the first object corresponding to the second object.

Another aspect of the present invention is explained as follows. A controlling means is structured such that when the timing is shifted from an appropriate timing, the controlling means amends the moving motion according to the extent of this shift. The controlling means performs a low speed motion if the timing is earlier than the appropriate timing, and perform a high speed motion if the timing is later than the appropriate timing, so that the moving timings of the first object and the second object match as a result. The second object is an object which flies and the first object is a tool to collide with the second object, and the described image processing device is used for a game device for ball games such as baseball games, tennis games, soccer games, basketball games, etc.

According to the present invention, these features can be achieved not by controlling the timing of beginning a movement of an object itself, but by giving precedence to controlling the movement motion of the object.

The image processing device comprises an image processing device comprising a character model and a polygon model for applying a transparency set to this character model, wherein the polygon model is applied to the character model and when applying the character model to this polygon model, the image processing of half transparency is performed for the character model based on the transparency data. Therefore, for example, even if the shadows overlap, the half transparency processing is performed by the transparency data which is set in the polygon model, therefore, it is possible to avoid generating an image which has incompatibility such that the part where the shadows overlap is displayed at a lower transparency than the other area.

One embodiment of the present invention includes an image processing device comprising an image processing means for performing an image processing movement which generates a shadow of the motion character moving on the display screen, when lights are irradiated to the motion character by a plurality of light sources, and this image processing device further comprises a shadow model which has color information and the transparency of 100% designated corresponding to each of the light sources, a gradation table wherein each of the shadow models overlap, each make a top layer and the transparency of the shadow models is set, a filter polygon which is overlapped under the graduation table except the match of the shadow model and the graduation table which is at the bottom most layer, has no color information but the transparency of 0% designated.

One shadow model is not influenced by the transparency designated to more than two gradation tables because of the function of the filter polygon, therefore, if more than two shadows overlap by the light of more than two light sources, it is possible to generate realistic shadows such that the shadows are dark where they overlap and the other independent area of the shadows are faint.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

First Embodiment

Figure 1:
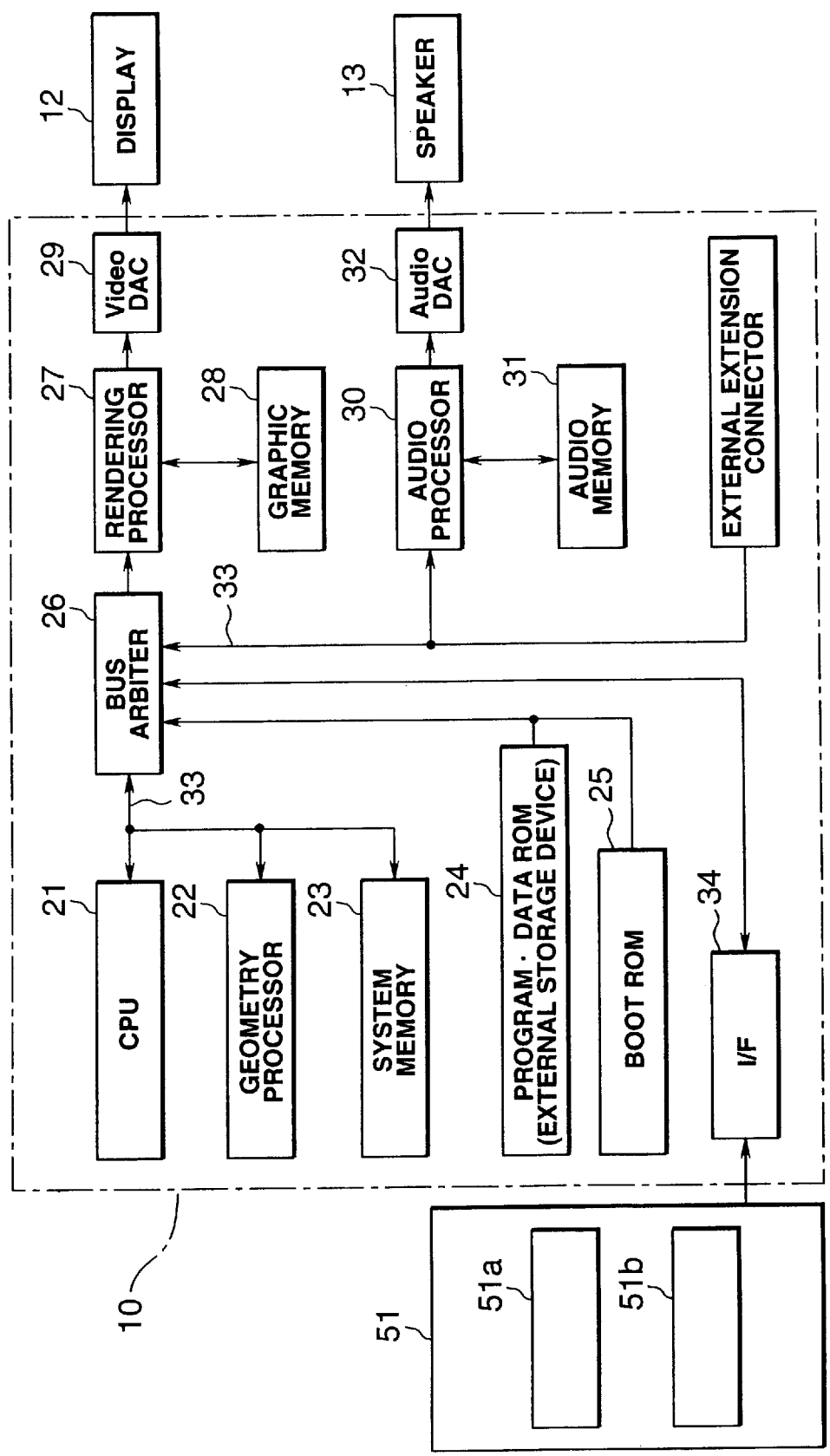
FIG. 1 is a schematic block diagram of the game device according to the present invention.

FIG. 1 is a block diagram of the game device. As shown in FIG. 1, the game device comprises game processing board 10. The devices such as operation member 51, display member 53, speaker 13, and external extension connector 41 are electrically connected to game processing board 10. The user can play a tennis game by operating each of the devices in operation member 51 while watching the game screen displayed on display member 53.

Game processing board 10 comprises, a counter, which is not illustrated in a diagram, CPU (Central Processing Unit) 21, geometry processor 22, system memory 23, program data ROM 24, boot memory 25, bus arbiter for bus controller 26, rendering processor 27, graphic memory 28, video DAC 29, audio processor 30, audio memory 31, audio DAC 32, and the parts of these elements are connected to one another by bus line 33.

Among these, CPU 21 is connected via bus line 33 to geometry processor 22 and system memory 23, while its first system being connected to program data ROM 24 and boot ROM 25, its second system being connected via I/F 34 to operation member 51, its third system being connected to external extension connector 41 and audio processor 30, and its fourth system being connected to rendering processor 27, respectively. Moreover, rendering processor is connected to graphic memory 28 and video DAC 29. Audio processor 30 is connected to audio memory 31 and audio DAC 32.

System memory 23 stores a predetermined program and an image processing program of this device in advance. Also, boot ROM 25 stores a system activation program in advance.

CPU 21, after its power is switched on, activates the system by reading the system activation program stored in boot ROM 25, and after that, it performs the processing relating to each calculation and control based on a program included in system memory ROM 23. The processing includes a processing of selecting a desired game mode from a plurality of game modes which are set in advance, processing peculiar to each game mode, behavior calculation (simulation) processing of player A, player B, tennis racket 204, and tennis ball 206 shown in FIG. 3, and calculation processing of special effects.

The behavior calculation is to simulate the movements of player A etc. in a virtual three dimensional space (game space). In order to perform it, after the coordinate values of polygons of player A etc. in the virtual three dimensional space are determined, a conversion matrix and form data (polygon data) to convert the coordinate values into a two dimensional visual field coordinate system are designated to geometry processor 22. Furthermore, polygon data means a coordinate data group of relative or absolute coordinates of each vertex of polygons which is constituted of a collection of a plurality of vertexes. As described herein, a polygon may typically be a triangle or quadrangle.

The form data constituted of a plurality of polygons (the three dimensional data of characters, geography, and background, etc. constituted of each vertex) are stored in program data ROM 24 in advance. This form data is sent to geometry processor 22. Geometry processor 22 performs perspective transformation of the designated form data at the conversion matrix sent from CPU 21 and obtains the form data which is converted from the coordinate system of three dimensional virtual space into the visual field coordinate system. This form data is sent to rendering processor 27.

Rendering processor 27 reads the texture data from graphic memory 28, pastes the texture to the form data of the converted visual field coordinate system, and outputs the data to the frame buffer inside video DAC 29. The polygon screen (the result of the simulation) of player A and the background etc. stored temporarily in the frame buffer and the scroll screen with letter information are synthesized in accordance with the designated priority, and the final frame image data is generated at certain intervals. This frame image data is given D/A conversion, sent to display 53, and displayed as a game screen in real time.

Audio processor 30 generates sound data based on the direction from CPU 21 and outputs the data via DAC 32 to speaker 13. Because of this, the sound data is amplified in power and output from speaker 13 as a sound.

Moreover, by operating operation member 51, the player can provide CPU 21 via I/F 34 with the tennis game information such as the game mode advancement information, the movement information of the player A and B, the movement information of tennis ball 206, the information of swinging the tennis racket, and the positional information of the viewpoint of a camera located in the virtual three dimensional space etc., while watching the display screen of display member 53.

The game device according to the present invention which is structured as described above, implements a predetermined function by the CPU's performance of the program which is read from program data ROM 24 (external storage device).

This embodiment performs the program of a tennis game stored in program data ROM 24. A tennis game is a match between two players by operating the players, in a respective side of a court using tennis rackets to hit the tennis ball.

Figure 2A:
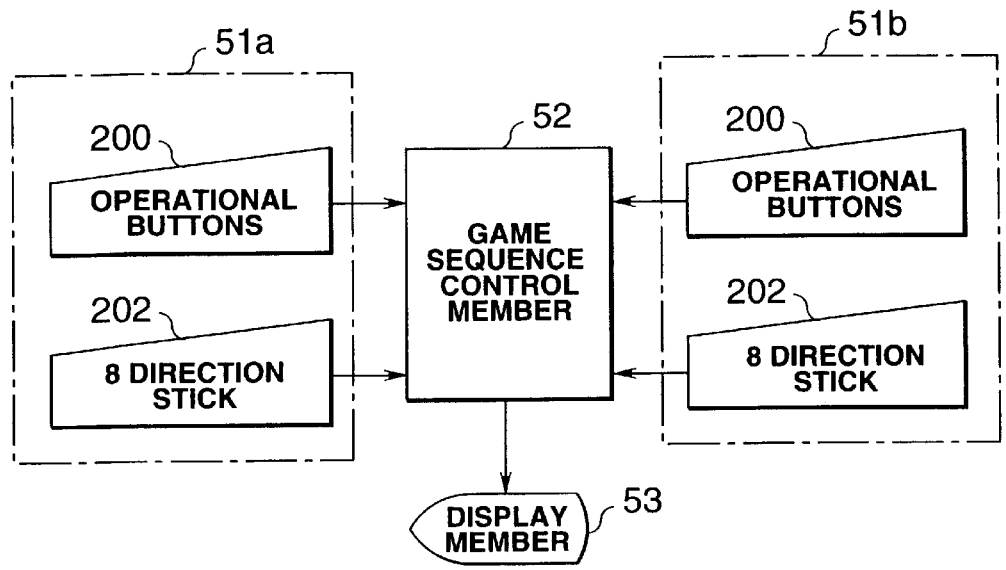
FIG. 2(A) is a block diagram of the operation member for performing the function of the game device and FIG. 2(B) is a perspective view of the operation member.

A game device to perform such tennis game is structured, as shown in FIG. 2(A), from operation members 51a and 51b, which player A and B operate respectively, and game sequence processing member 52, which performs the processing so that the game program displays the scenes of the tennis match on display member 53 (please refer to FIG. 3) according to the operation conditions of these operation members 51a and 51b. Player character A and B perform operations for developing the tennis game at operation members 51a and 51b, in accordance with the display screen of the displaying means 53 based on the processing of game sequence processing 52.

Figure 2B:
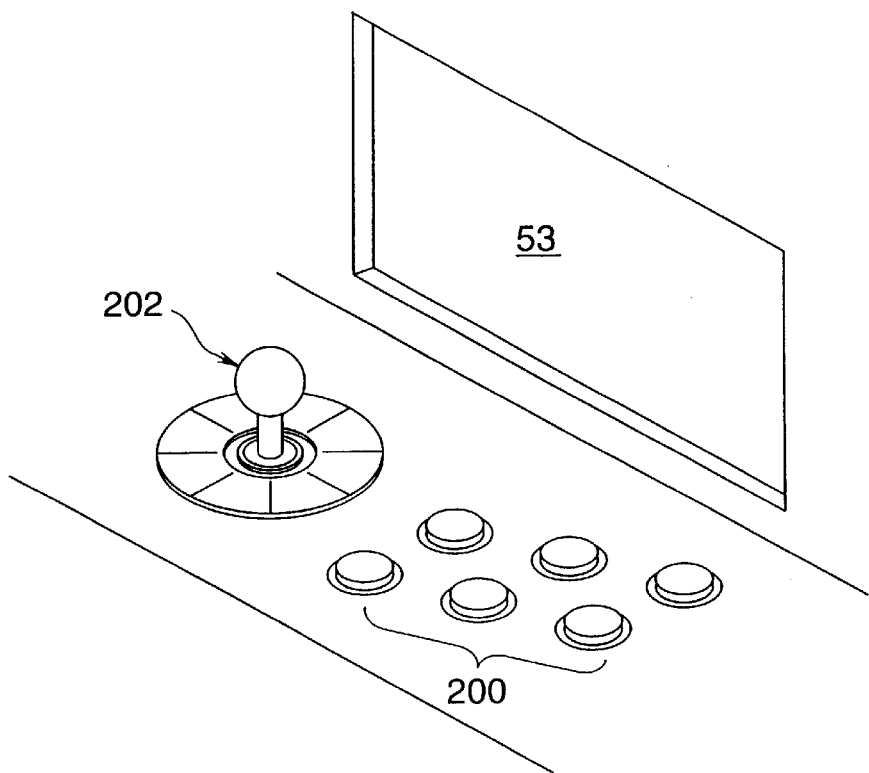

Operation members 51a and 51b are structured, as shown in FIG. 2(B), from a plurality of operational buttons 200 and 8 direction stick 202 constituted of an arm which can be moved in 8 different directions. Operational buttons 200 are provided to perform the start of the swinging of the tennis racket 204 and the different ways of swing, and 8 direction stick 202 is provided to control player A and B to move in the direction of the ball.

Furthermore, when there is one player, it is possible to develop the tennis game in, what is called, a computer competition mode in which the operation of the other player is performed by game sequence processing member 52.

Here, the present embodiment is characterized in that the speed of the series of movements when the player character A (or B) swings the tennis racket and hits the tennis ball is controlled (hereinafter, the explanation follows assuming that the player character is an object of this movement control).

Figure 3:
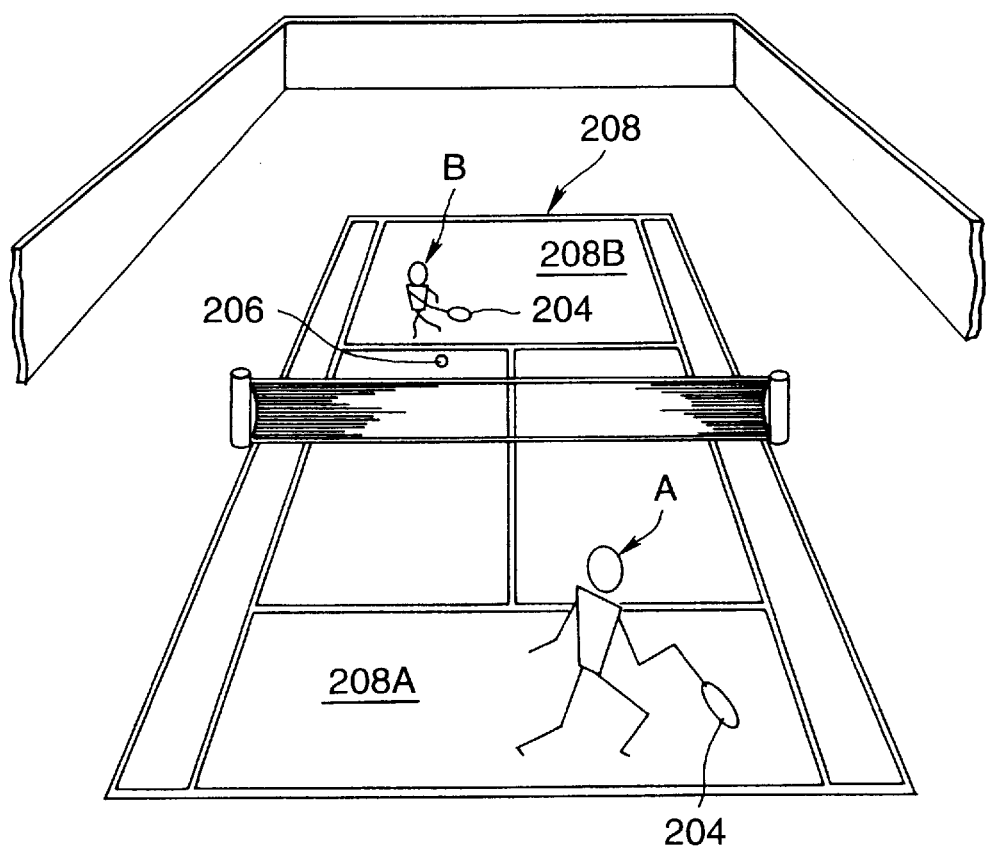
FIG. 3 illustrates a scene of the display screen of the display member.

As shown in FIG. 3, after the player character A moves in the direction of tennis ball 206 in order to hit tennis ball 206 (this movement is performed by operating 8 direction stick 202 (please refer to FIG. 2(B)) which constitutes a part of operation member 51a), the series of movements from the beginning of the swinging of the racket to its end is started/regenerated from the time when operational buttons 200 (please refer to FIG. 2(B)) for swinging tennis racket 204 are operated and input.

Here, if tennis ball 206 exists in the path of the swing of tennis racket 204 in a good timing within a predetermined time range, it is judged that there was a collision of the racket and the ball, in other words, tennis ball 206 was hit. The collision angle of the impact in the time range, in short, the collision angle of tennis racket 204 and tennis ball 206 is calculated, by which the speed and the direction of the tennis ball is calculated, then the display control is performed in which the ball is hit to the competitor's side of the court.

If the operation of operational buttons 200 to start the swinging movement is conducted out of the time range, such swing is judged as a bad swing and the display control is performed in which tennis ball 206 directly moves behind (front side of FIG. 3) player character A. Therefore, player character A needs to operate operational buttons 200 with good timing. Moreover, even if the operation timing of operational buttons 200 is accurate, the display control of a bad swing or a mis-hit is performed unless the relative positional relationship between player character A and tennis ball 206 is not in a predetermined range.

In the two dimensional display of tennis court 208 on the screen of the present embodiment, player characters A and B are displayed differently in size so that there is the perspective between player characters A and B. Moreover, because of the characteristic of the rules of tennis, player character A exists in the area of the front side 208A in one case but exists in the back side 208B in another case. Here, the shift of timing for swinging tennis ball 206 is liable to happen because of the perspective between front side 208A and back side 208B.

Therefore, the present embodiment provides a time range for the amendment of the timing before and after the predetermined time range. When operational buttons 200 are operated within the time range for amending the timing which is before the predetermined time range, it controls the collision time (impact time) of tennis ball 206 to be within the predetermined time range by slowing down the speed of the series of movements of tennis racket 204, in short, by selecting a slow motion. On the other hand, when operational buttons 200 are operated within the time range for amending the timing which is after the predetermined time range, it controls that the collision time (impact time) of tennis ball 206 to be within the predetermined time range by quickening the speed of the series of movements of tennis racket 204, in short, by selecting a fast motion.

Figure 4:
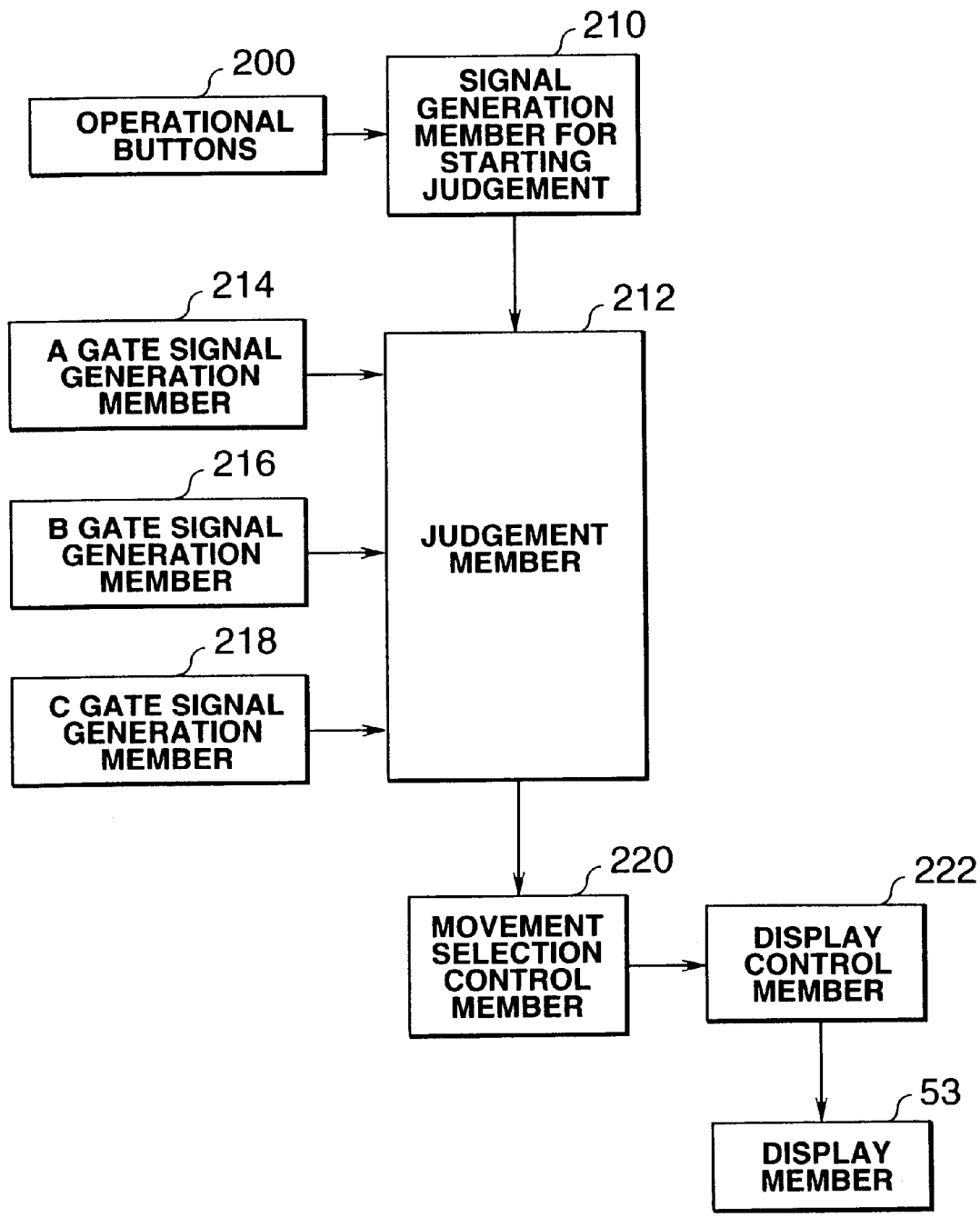
FIG. 4 is a block diagram to perform analysis based on the timing of the movement of swinging the tennis racket.

FIG. 4 shows a block diagram of the control described above. The input signal from operational buttons 200 is input to signal generator for starting judgment 210. Signal generator for starting judgment 210 outputs a signal to judgment member 212 at the same time when the operation of operational buttons 200 is input.

Judgment member 212 is connected to A gate signal generator 214 for generating a gate signal based on the predetermined time range, B gate signal generator 216 for generating a gate signal based on the time range for amending the timing before the predetermined time range, and C gate signal generator 218 for generating a gate signal based on the time range for amending the timing after the predetermined time range, and judgment member 212 judges the movement mode based on the condition (1 or 0) of each signal for starting judgment at the time when they are input from signal generator for starting judgment 210. The signal based on the movement mode judged is output to movement selection control member 220, by which the movement mode is selected and sent to display control member 222. Display control member 222 controls display member 224 and displays the series of movements (the movement of swinging tennis racket 204) based on the selected movement mode.

Figure 5:
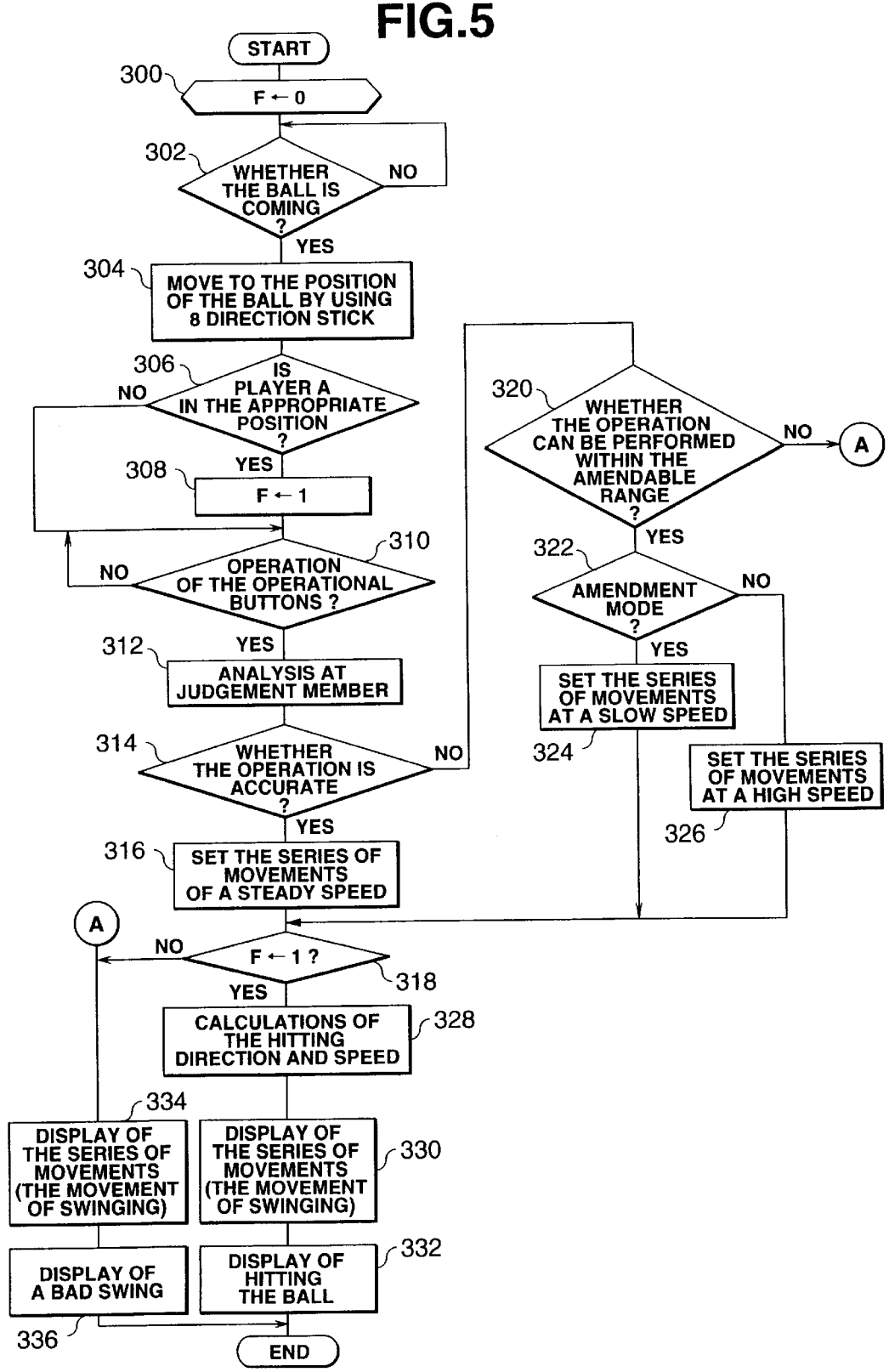
FIG. 5 is a control flow chart according to the first embodiment.

The function of the present embodiment is hereinafter explained with reference to the flow chart in FIG. 5 as well as the timing chart in FIG. 6(A).

In step 300, flag F is reset (0) and in step 302, it is judged whether tennis ball 206 flies to player character A. If it is judged affirmatively, the computer proceeds to step 304 in which player A is moved to the position of tennis ball 206 by operating 8 direction stick 202.

In step 306, it is judged whether player character A is in the appropriate position, in short, the position where tennis ball 206 can be hit, and if it is judged that it is in such position, the computer proceeds to step 308 to set (1) flag F and further proceeds to step 310. If it is judged that player character A is in the inappropriate position, in short, a position where tennis ball 206 can not be hit, the computer directly proceeds to step 310 by skipping over step 308.

In step 310, it is judged whether operational buttons 200 are operated. In other words, it is judged whether player character A directed to start swinging tennis racket 204. When it is judged affirmatively, the computer proceeds to step 312 in which judgment member 212 analyzes whether the operation time of these operational buttons 200 is appropriate, as shown in FIG. 4.

Figures 6A, 6B:
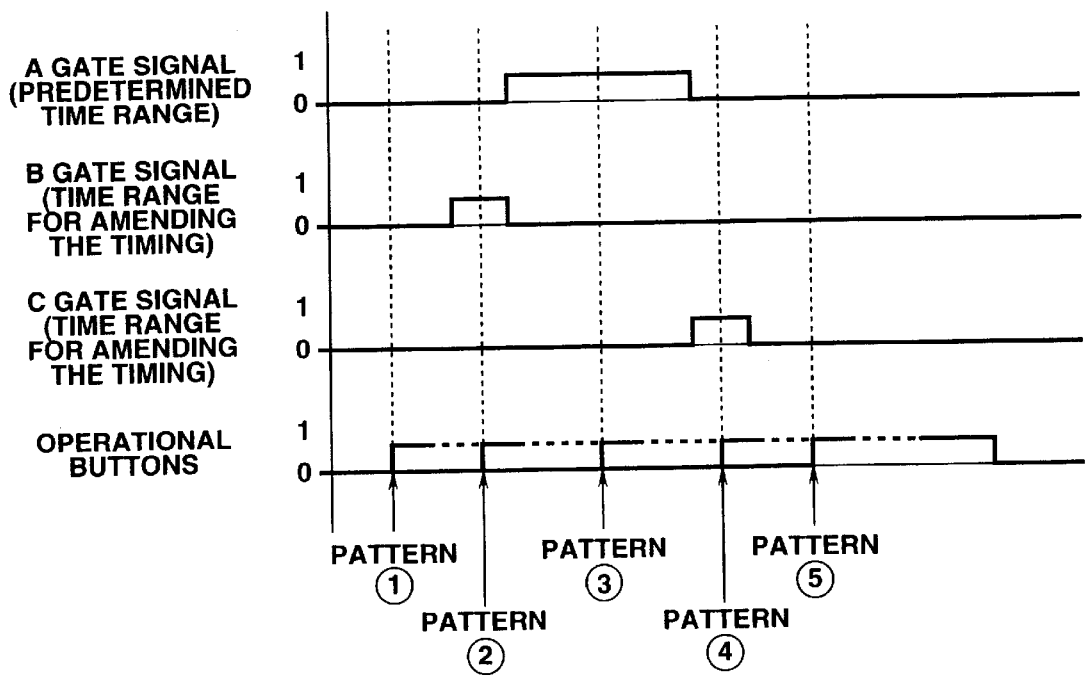
FIG. 6(A) is a timing chart for setting the movement mode for setting the timing of the movement of the tennis racket by inputting at the operation member.
FIG. 6(B) is a chart for reading the result of the timing.

As shown in FIG. 6(A), judgment member 212 takes in each signals and determines the series of movements depending on when the activation of the signal for starting judgment based on the operation of operational buttons 200 is conducted. This determination is performed based on the judgment table in FIG. 6(B).

When the analysis in step 312 (the determination of the series of movements) is over, the computer proceeds from step 312 to step 314 in which a judgment is made regarding whether the operation time of operational buttons 200 was accurate. If the judgment is affirmative, in other words, if it is judged that the operation time of operational buttons 200 was accurate, the computer proceeds to step 316 to set the predetermined series of movements, then proceeds to step 318.

Furthermore, if the judgment is negative, in other words, it is judged that the operation time of operational buttons 200 was not accurate, the computer proceeds to step 320 in which it is judged whether the operation time is within an amendable range even if the operation time is not accurate. The amendable range means a range in which operational buttons 200 can be operated in the time range for amending the timing, and if it is judged affirmatively in step 320, an amendment mode is selected in steps 322, 324, and 326. In short, either performing the series of movements at a slow speed (step 324) or performing it at a fast speed (step 326) is set, and the embodiment proceeds to step 318.

In step 318, it is judged whether the flag F is set (1), and if it is judged that it is set, it is possible to hit tennis ball 206 and the computer proceeds to step 328 in which the hitting direction and speed is calculated, then to step 330 in which the series of movements are displayed. Here, the series of movements are performed at either speed set in step 316, 324, or 326. In step 332, the display of hitting is performed and the processing ends.

On the other hand, if the judgment in step 318 is negative, in other words, if it is judged that flag F is reset (0), the ball can not be hit regardless of the operation time of operational buttons 200, therefore, the computer proceeds to step 334 in which the series of movements (the movements of swinging tennis racket 204) are displayed, then to step 336 in which the display of a bad swing is performed and the processing ends. Furthermore, if it is judged that the operation time of operational buttons 200 is outside the amendable range, the computer also proceeds to step 334 in which the series of movements and a bad swing are displayed and the processing ends.

The above embodiment can solve the unfairness among the users which results from the differences in the quantity of experiences regarding the difference in the timing of the series of movements (the movements of swinging tennis racket 204) between front side 208A and back side 208B having the perspective therebetween on the display screen, by providing the time range for amending the timing before and after the predetermined time range which indicates the appropriate operation input of operational buttons 200 for the series of movements, and by slowing down the speed of the series of movements if the operation of operational buttons 200 is performed early or by quickening the speed if the operation is performed late.

In a mode where the speed of the movements of the player character is fast, such motion is selected and displayed that requires a short time for the player to begin and end swinging the racket, on the other hand, in a mode where the speed is slow, such motion is selected and displayed that requires a slightly long time in doing it. In these motions, such images are provided that the player character takes postures which correspond to the fast movements and slightly slow movements. Furthermore, the motion of the player character can be obtained from the real-time calculation processing based on a predetermined function formula.

In the present embodiment, this motion control processing can be performed to both or either player characters in fighting games among a plurality of users. Particularly, it is more effective to perform the control processing to character B which is arranged far from the virtual camera than to perform it to character A which is closer to the virtual camera. This is because the user controlling character B can not easily recognize the positional relationship between character B and the ball, for example, the distance or angle between the ball and the racket, therefore, character B is liable to be in a disadvantageous position compared to character A. It is possible to change the extent of the amendment between characters A and B. In other words, it is also possible to amend the movement of the character which is farther away from the virtual camera preferentially to the character which is close to the virtual camera.

Second Embodiment

Although it is not illustrated in the three dimensional display screen in FIG. 3, the game modes includes a night mode in which the processing of turning on the floodlights is performed. Player character A (and player character B) and tennis ball 206 have their shadows on the surface of the court corresponding to the lights.

Figure 7:
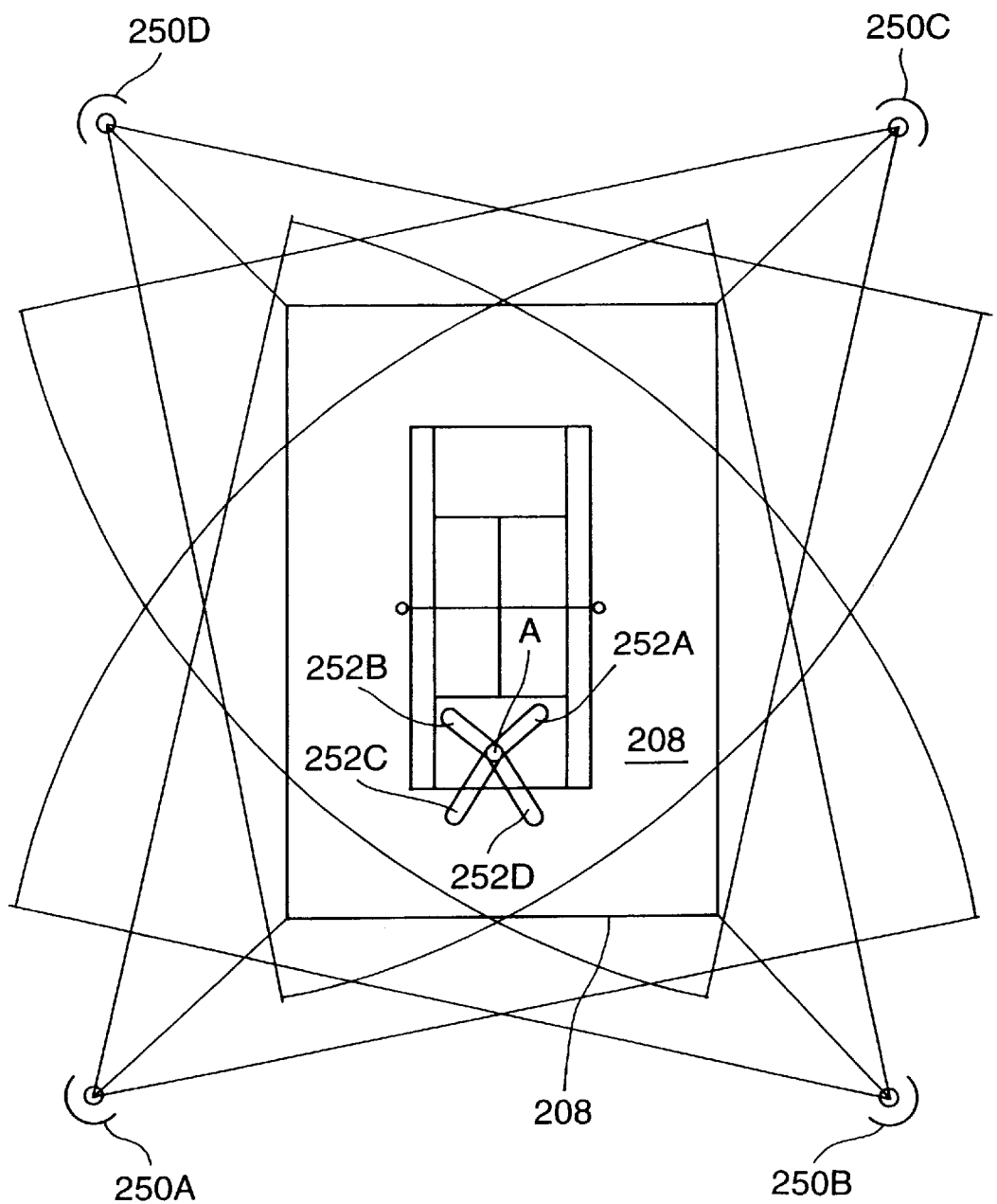
FIG. 7 is a top view according to the second embodiment illustrating the areas of the lights illuminating the tennis court.

FIG. 7 is a virtual overhead view of the display screen and the lights are irradiated from the 4 edges of the court where the 4 floodlights, 250A, 250B, 250C, and 250D respectively exist. Here, shadow 252A which is generated from the light from one floodlight 250A is constituted of polygons of a black shadow model (shadow 252B, 252C, and 252D are generated likewise).

Figure 8:
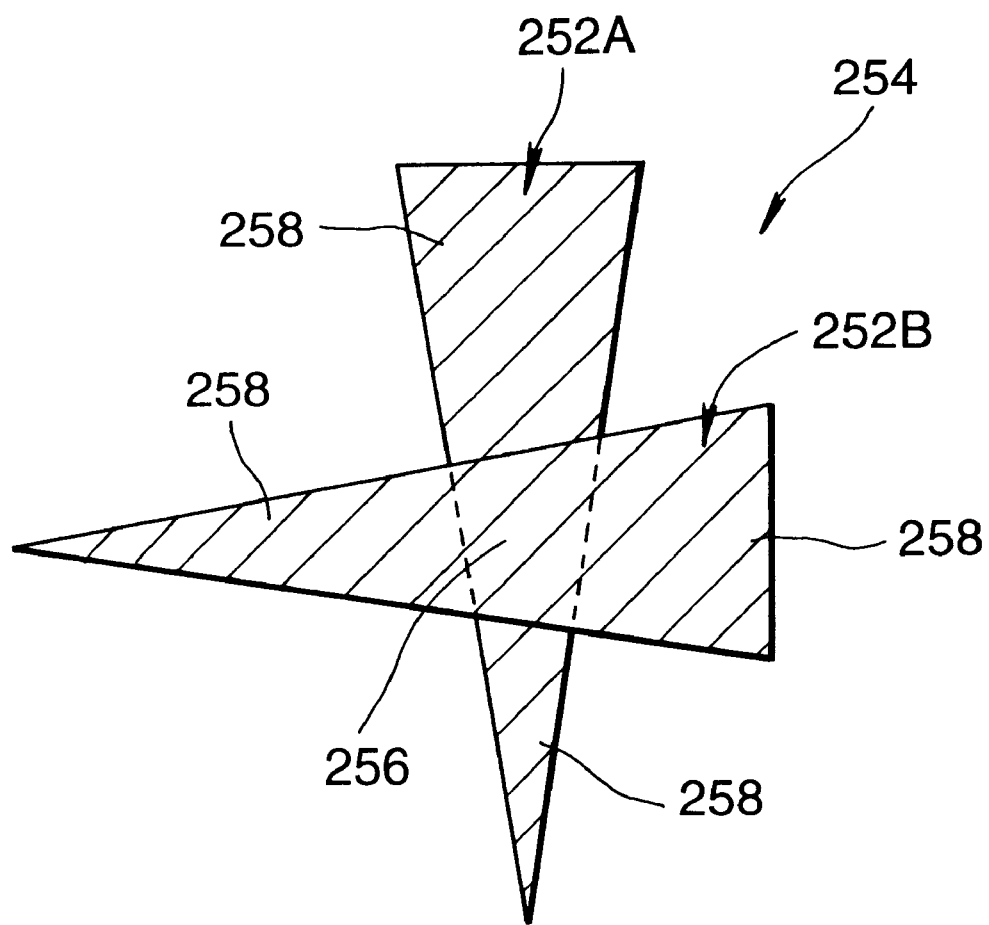
FIG. 8 is a top view illustrating the condition of shadows when only the shadow models overlap.

For example, as shown in FIG. 8, shadow 254 is generated from two floodlights 250A and 250B that exist independently, therefore, each is constituted of respective shadow models 252A and 252B. Regarding the two shadows 252A and 252B generated for one object (player character A), there is common area 256 where the two shadows overlap and independent area 258 where the shadows do not overlap. Because common area 256 is the shadow generated from the light of the combination of two floodlights, the shadow is more realistic if it is darker than the shadow of independent area 258.

Figure 9A:
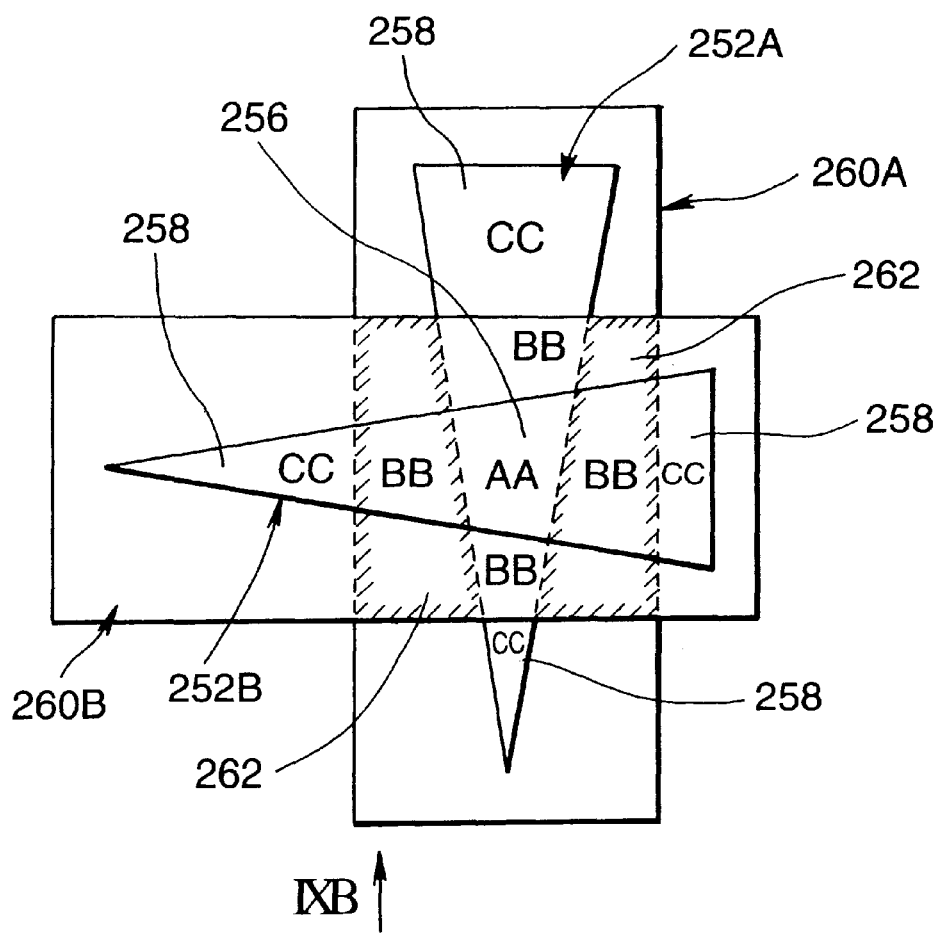
FIG. 9(A) is a top view when the gradation tables are arranged corresponding to each of the shadow models.
Figure 9B:
FIG. 9(B) is a side view of FIG. 9(A) from the IXB direction.

At this point, as shown in FIG. 9(A) and FIG. 9(B), a parameter is set for the two shadow models 252A and 252B for changing the transparency of each of the two shadow models between 0 and 1 respectively, and the transparent tabular polygons 260A and 260B for achieving the gradation effect are provided for the shadow models having the black color which is displayed on the polygon. If the black shadow models 252A and 252B are pasted on the polygons, the gradation processing for changing the darkness of the shadow respectively is performed to each of the shadow models 252A and 252B at the transparency (the value α) designated by gradation tables 260A and 260B. Here, from the top to the bottom, the shadow polygon 252B, table polygon 260B, shadow polygon 252A, and table polygon 260A overlap in this sequence.

Regarding independent area 258 where the two table polygons do not overlap, the darkness is respectively set by the transparency designated by both gradation tables. Regarding common area 262 where the two table polygons overlap, the parameters of the transparency designated by both polygon tables are applied doubly and the shadow of common area 262 is displayed more darkly than the shadow of independent area 258. Especially the part where both shadow models overlap, the shadow is displayed even darker because the texture data of the two shadow models overlap.

In the concrete example of a tennis court, if the court surface is lawn grass, the shadow of the independent area is dark green which is darker than the green of the lawn grass, and the shadow of the common area is a green which is almost black.

Furthermore, in the conventional art, the part where the shadow models overlap, for example, the joint parts of a model of a human body, has the low transparency because the value α is set for a plurality of shadow model polygons. On the other hand, in the present invention, the part where the shadows overlap is displayed in the same darkness at the same value a as the part where the shadows do not overlap, by setting that the shadow model is a polygon which does not have the value α, setting the value α to the described table polygon, and pasting the shadow model to this polygon, or if the value α for gradation processing purpose is adopted, the shadow is displayed such that the darkness changes. In a game space where a single light source is set, it is not realistic if the part where the shadow models overlap (joints of a human body model etc.) is displayed darkly. However, by adopting the structure of the present invention which is explained herein, it is possible to display the part where the shadow models overlap in the same darkness as the part where the shadow models do not overlap in a same concentration, thus a realistic image can be generated.

On the other hand, in a game space where a plurality of light source models exist, it is realistic that the part where the shadows overlap is displayed more darkly than the part where the shadows do not overlap. Provided however, in FIG. 9(A), the shadow parts BB, except the part AA where the shadows overlap, in area 262 where the table polygons overlap, are displayed more darkly than the shadows CC which is the rest of the shadows except the shadow AA and BB. In order to make it more realistic, it is necessary to make the part BB have the same darkness as the part CC. This will be explained in detail hereinafter.

Figure 10:
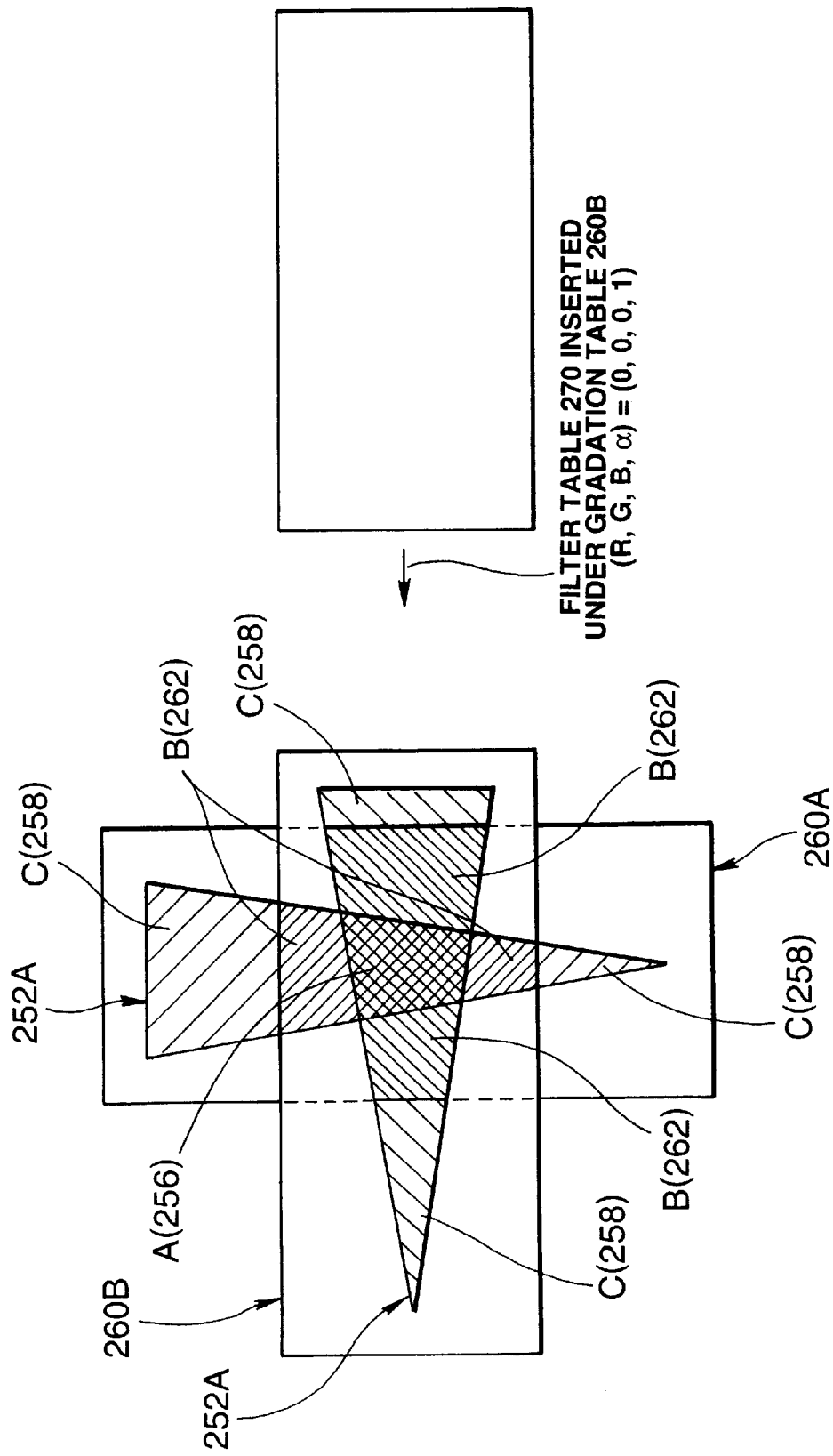
FIG. 10 illustrates the recognition of the defective shadow of FIG. 9.

As shown in FIG. 10, there is area A256 (area AA in FIG. 9) having a shadow which is extremely dark. The shadow of this area is displayed most darkly because the transparency data of two polygons are reflected to the two shadow model polygons. There is area B262 (area BB) having shadows of medium darkness. The transparency data of the two polygon tables is reflected to each shadow polygon, therefore, the shadow of medium darkness is generated. C258 (area CC) is a part which has shadows of standard darkness. At this point, because the generation of the shadows of medium darkness is not realistic, the image processing which does not generate such shadows becomes necessary.

In the image processing of the tennis game of the present embodiment, as shown in FIG. 10, filter table 270, which is a polygon model having a parameter (the transparency 0) which nullifies or cancels the value α of the polygon table located under polygon table 260A, is arranged on polygon table 260A. In fact, it is structured so that this filter table is arranged in advance on the polygon table which is pasted with a shadow polygon.

Figure 11:
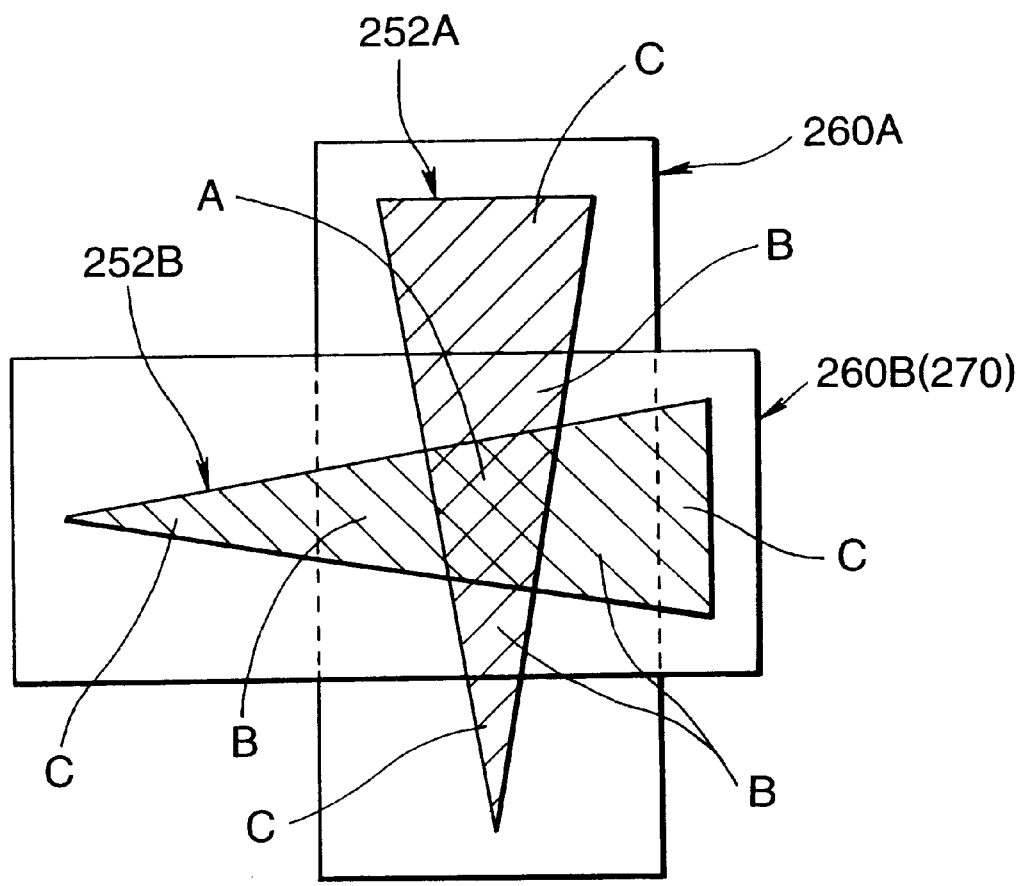
FIG. 11 is a top view of an embodiment of the present invention, where the filter table is inserted in the combination of the shadow models and the gradation tables.

Because of this arrangement of filter table 270, as shown in FIG. 11, area A having a shadow displayed most darkly has a color made by overlapping the two polygons of two shadow models and the shadow is displayed more darkly than the shadows of the other areas. On the other hand, in area B of medium darkness, not the transparency of polygon table 260A but the transparency of polygon table 260B is applied to the shadow model 252B, which is located on top when one views it from the top, while the transparency of the polygon table 260A is applied to the shadow polygon 252A which is below 252B. Therefore, the transparency parameter of polygon table 260B is applied to the color of each shadow model and area B is displayed in the same darkness as the other area C.

The shadow models 252A and 252B, gradation table 260A and 260B, and filter table 270 can be expressed in data form such as (R, G, B, α) respectively. R, G, and B indicates the brightness of each color, red, green, and blue, and 0 means that there is no color to be applied while 1 means that a color is reflected 100%. α means the transparency, 0 means 100% transparency, and 1 means 100% opacity.

The first shadow model 252A is (0, 0, 0, 0), and only the area of shadow is set while the model itself has no color. The first gradation table 260A is (0, 0, 0, $\alpha_1$), and $\alpha_1$ can have the value of 0~1 depending on the quantity of light from floodlight 250A. The second shadow model 252B is (0, 0, 0, 0), and only the area of shadow is set while the model itself has no color. The second gradation table 260B is (0, 0, 0, $\alpha_2$), and $\alpha_2$ can take the value of 0~1 depending on the quantity of light from floodlight 250B.

Filter table 270, which is provided under the second gradation table 260B, is (0, 0, 0, 1), and the table itself has no color but is a completely impairment table. Consequently, the degree of influence of the layers which are under filter table 270 to the upper layers is calculated by the following equation. (0, 0, 0, 1)×(1, 1, 1, 1)+(R of bottom layer, G of bottom layer, B of bottom layer, α of bottom layer)×(1, 1, 1, 1)+(R of bottom layer, G of bottom layer, B of bottom layer, α of bottom layer)=(R of bottom layer, G of bottom layer, B of bottom layer, 1). Shortly, no matter what values they have, R of bottom layer, G of bottom layer, B of bottom layer do not reflect the degree of influence because the value α in the last member is 1.

Conclusion

As explained above, the present invention provides a system in which a game using a game device can be developed smoothly by assisting the user's operation of the game device.

The present invention provides a game device for hitting or hitting an object such as a ball by a series of movements in a short period such as swinging a racket or a bat, wherein the series of movements are preferably matched to the behaviors of an object, such as a ball, by accurately assisting or helping the user's operation without impairing the user's will.

The present invention can display a highly realistic representation of the game image. The present invention can provide a game device which allows processing such that the display of shadows of objects on the game screen complies with the display of real shadows.

The present invention performs operation processing control which does not depend on the degree of experience of a user of the game device, and victory or defeat is influenced only by the technology of the game itself, furthermore, it is possible to create a more realistic image by the existence of the shadow of an object moving on the screen.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An image processing device comprising an image processing means for performing an image processing movement which controls to operate a motion character which conducts a series of movements in order to change a moving direction of a movable body on a screen, in a timing of operating an operation member, wherein, said image processing means comprises a movement controlling means wherein a time range appropriate for an operation input at said operation member is set in advance, and when there is the operation input within said time range, said motion character is moved at a correct movement speed in advance, and when there is the operation input before said time range, said motion character is moved at a lower speed than said correct movement speed, and when there is an operation input after said time range, the motion character is moved at a faster speed than said correct movement speed.

2. The image processing device according to claim 1, wherein there are impact timings of the movable body and the motion character in said series of movements, and said movement controlling means match said impact timings when the operation input is outside said time range.

3. An image processing method that includes performing an image processing movement which controls to operate a motion character, which conducts a series of movements in order to change a moving direction of a movable body on a screen, in a timing of operating an operation member, comprising:

setting in advance a time range appropriate for an operation input at said operation member;

moving said motion character at a correct movement speed in advance when there is the operation input within said time range;

moving said motion character at a lower speed than said correct movement speed when there is the operation input before said time range; and, moving said motion character at a faster speed than said correct movement speed when there is the operation input after said time range.

4. The image processing method according to claim 3, wherein there are impact timings of the movable body and the motion character in said series of movements, said method further comprising:

matching said impact timings when the operation input is outside said time range.

* * * * *